United States Patent
Kupper et al.

[11] Patent Number: 5,375,776
[45] Date of Patent: Dec. 27, 1994

[54] METHOD AND APPARATUS FOR THE COMMINUTION OF MATERIAL FOR GRINDING

[75] Inventors: Detlev Kupper, Telgte; Osbert R. Knobloch, Rheda-Wiedenbrück; Ludger Kimmeyer, Beckum; Werner Brosowski, Hamm, all of Germany

[73] Assignee: Krupp Polysius AG, Germany

[21] Appl. No.: 138,922

[22] Filed: Oct. 19, 1993

[30] Foreign Application Priority Data

Nov. 25, 1992 [DE] Germany ............... 4239602

[51] Int. Cl.$^5$ ............................................. B02C 23/22
[52] U.S. Cl. .................................. 241/19; 241/61; 241/79; 241/80
[58] Field of Search .............. 241/19, 24, 60, 61, 241/79, 80, 52, 97, 79.1

[56] References Cited

U.S. PATENT DOCUMENTS

| | | | |
|---|---|---|---|
| 2,205,177 | 6/1940 | Schlegel et al. | 241/80 X |
| 2,554,450 | 5/1951 | Ayers | 241/80 X |
| 3,323,727 | 6/1967 | Heilmann | 241/19 |
| 4,193,554 | 3/1980 | Ansen et al. | 241/19 |
| 4,304,360 | 12/1981 | Luhr et al. | 241/19 X |
| 4,783,012 | 11/1988 | Blasczyk et al. | 241/80 X |
| 4,840,315 | 6/1989 | Rubin et al. | 241/80 X |
| 5,111,998 | 5/1992 | Kanda et al. | 241/19 X |

FOREIGN PATENT DOCUMENTS

| | | | |
|---|---|---|---|
| 403778 | 12/1990 | European Pat. Off. | 241/80 |
| 0406591 | 1/1991 | European Pat. Off. | |

*Primary Examiner*—Timothy V. Eley
*Attorney, Agent, or Firm*—Learman & McCulloch

[57] ABSTRACT

The invention relates to the comminution of material for grinding, particularly for the production of cement, wherein the material for grinding is comminuted in a mill and the comminution product is classified in a classification zone into fines and oversize material and the oversize material is returned to the mill. With a view to effective influencing of the breadth of the particle size distribution as well as a relatively low specific energy consumption the comminution product is classified in the classification zone in at least two air separators which are connected one behind the other in series, and a proportion of the oversize material from the first air separator is returned directly to the mill, the remaining proportion being delivered to the second air separator.

17 Claims, 2 Drawing Sheets

METHOD AND APPARATUS FOR THE COMMINUTION OF MATERIAL FOR GRINDING

The invention relates to a method and apparatus for the comminution of material for subsequent grinding.

BACKGROUND

Brittle materials utilized in the production of cement conventionally are comminuted to reduce the material to fine particles. Such brittle material may include, for example, cement, clinker, gypsum and granulated blast furnace slag, which typically are comminuted either separately or as a mixture and constitute the principal components of the cement product. In this case the comminution of the material for grinding takes place in a closed circuit, in which comminution product coming from a mill is classified in a classification zone into fine material, which is drawn off as finished product, and oversize material, which is not yet sufficiently comminuted and is returned to the mill for further comminution.

It is generally known in the art that cements or similar products which are ground in a closed circuit with a high-pressure grinding roll mill differ in their quality characteristics from those products which are produced in roller mills, ball mills or the like. These differences of quality are expressed principally in a greater use of water than, for example, with ball mill products for the standard stiffness of cement mortar or concrete. Starting from this problem, therefore, it is proposed in EP-A-406 591 inter alia that the agglomerated comminution product, so-called scabs, coming from a high-pressure grinding roll mill should first of all be disagglomerated and then a part thereof should be fed directly back to the mill, whilst the other part of the comminution product is separated in two air separators which are connected in parallel and set to different degrees of fineness, i.e. the proportion of the comminution product passed to the classification zone is first of all divided in a material stream divider into two part-streams, of which one part stream is delivered to one air separator and the other part-stream is delivered to the parallel-connected second air separator. Whereas the entire quantity of oversize material from each separator is returned directly to the mill, the fines from both parallel-connected separators are mixed together and drawn off. This should make it possible for the particle size distribution the finished product to be set specifically over a large range during energy-saving comminution in order to be able to achieve a particularly favourable behaviour during processing with the desired strength development.

The object of the invention is to make further developments in such a way that with specific setting possibilities in the particle size distribution of the finished product the desired product quality can be achieved with a further reduced and relatively low specific energy consumption.

SUMMARY OF THE INVENTION

According to this method of the invention, in the classification zone the comminution product coming from the mill is subjected to air separation in at least two separating stages arranged one after the other in series, wherein the accumulated fines are drawn off from the first air separation stage and the oversize material is divided into two part-streams, of which one first oversize material part-stream is returned directly to the mill and a second oversize material part-stream is delivered to a second air separation stage, from which all oversize material is then also returned to the mill and the fines are brought together with the fines from the first air separation stage and mixed and drawn off as finished product.

In the tests on which the invention is based it was possible to confirm that precisely this series connection of air separation stages or air separators in the classification zone entails a specific energy consumption which is markedly reduced by comparison with the known construction (EP-A-406 591) explained above. In this case, however, the series connection of the air separation stages/air separators which is proposed according to the invention creates a quite specific setting possibility for the particle size distribution in the finished material or finished product, i.e. a desired and effective influence in the breadth of this particle size distribution, as a result of which the product quality which is desired or necessary in each case can be ensured. This to some extent produces a type of multi-parameter separation.

It is particularly advantageous if in the classification zone the first air separation stage is operated as the fine separation stage and the second air separation stage is operated as the coarse separation stage.

Furthermore, in many cases it can be particularly advantageous if, before the actual classification zone (with the two air separation stages), the comminution product coming from the mill is also subjected to a preliminary separation from which the accumulated oversize material is also returned to the mill and only the fines are passed on to the classification zone. Such a relatively coarse preliminary separation of the comminution product before the classification zone is preferred above all when it is intended that a measurable quantity of oversize material should enter the fine/finished material in order thereby to achieve a particularly broad particle size spectrum (with sufficiently fine and coarse proportions of material) in the finished material. The air separation stages in the classification zone can be appropriately relieved of load by the use of this coarse preliminary separation, so that on the one hand they can be used more precisely and on the other hand they can be relieved of load in the desired manner. The latter brings with it a corresponding reduction in the expenditure on apparatus. Moreover, however, the relief of the load on the air separation stages by the preliminary separation also results in a marked reduction in wear within the air separators used in the air separation stages, since excessively coarse quantities of material which are particularly wearing are separated out of the comminution product in the preliminary separation and can be returned to the mill.

A particularly low-wear and energy-saving preliminary separation of the comminution product can be carried out particularly favourably in the form of a fluidised bed separation.

A very advantageous and preferred embodiment of the invention is to be seen in a method in which the material for grinding, particularly brittle material for grinding, is comminuted in a high-pressure grinding roll mill with rolls which revolve in opposite directions and are pressed against one another at high pressure. In this case it is also advantageous for the comminution product coming from the high-pressure grinding roll mill to be passed through a disagglomeration stage before being introduced into the classification zone, in which case the possibility exists if required for a proportion of the broken-up comminution product to be branched off after the disagglomeration stage and returned directly to the mill for further comminution, whilst the remaining proportion of the comminution product is passed to the classification zone.

It is also particularly advantageous if at least in the first air separation stage a particularly selective high-capacity air separation which can be regulated within wide limits is carried out in terms of adjustability of the particle size distribution of the fine material. This embodiment of the invention is particularly preferred in combination with a use of the high-pressure grinding roll mill discussed above for the comminution of the material for grinding.

The invention will be explained below with the aid of some embodiments which are illustrated in the drawings.

THE DRAWINGS

In FIGS. 1 and 2 the drawings show simplified diagrams of two preferred embodiments of the comminution apparatus according to the invention.

DETAILED DESCRIPTION

In both embodiments it may be assumed that the apparatus illustrated there is a cement grinding apparatus in which one or several components, e.g. cement clinker, gypsum, blast furnace slag (slag cement) or the like—separately or together—can be comminuted in a circuit to produce cement with a predetermined fineness and particle size distribution.

Figure 1:
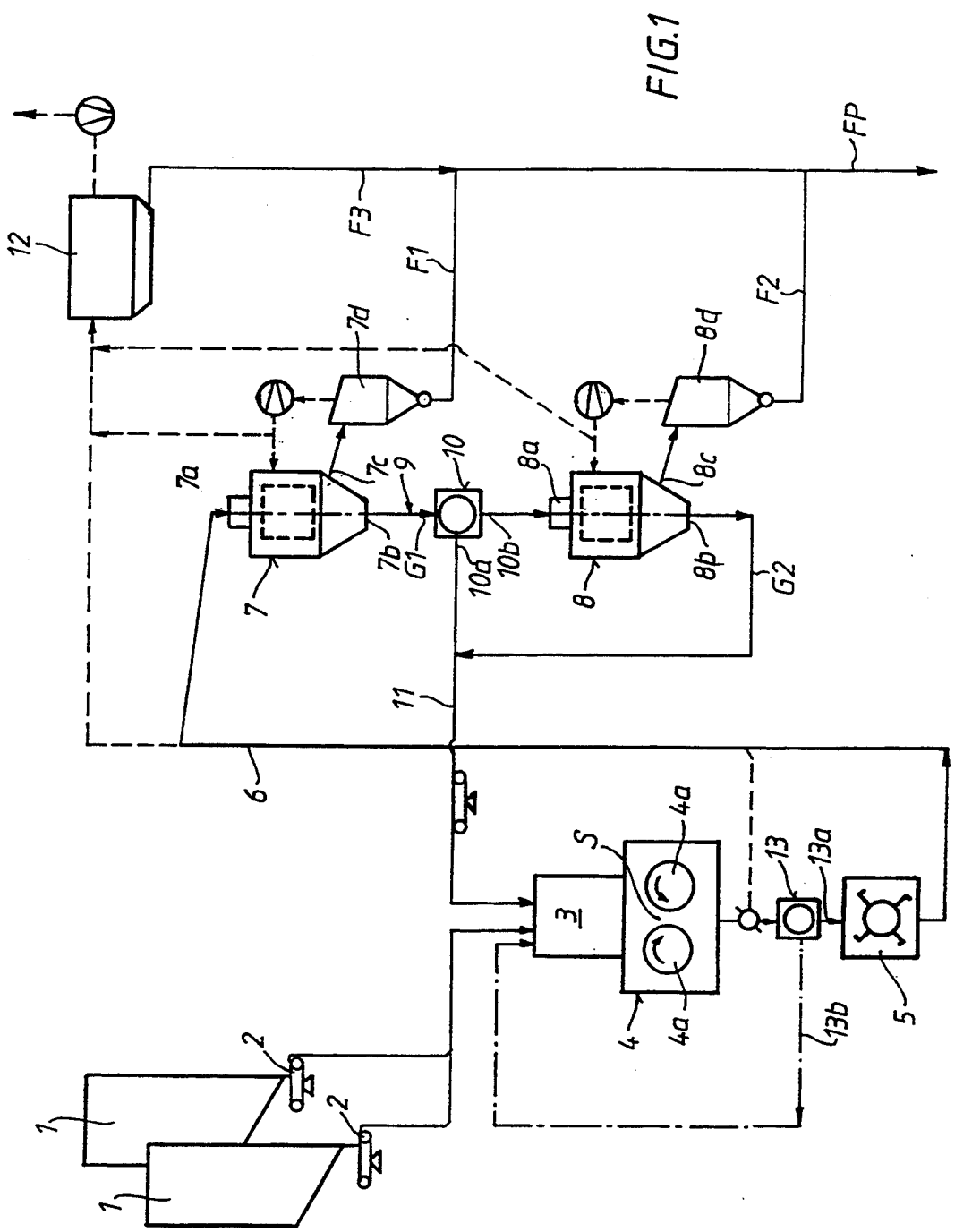

According to the first embodiment which is illustrated in FIG. 1 the comminution apparatus contains several feed bins 1 for various components of the material for grinding which can be delivered in measured quantities for example with the aid of conventional belt scales 2 to the material inlet shaft 3 of a mill 4. The comminution product coming from this mill 4 can be delivered as required either directly—as indicated by broken lines—or via a disagglomerator 5, which will be explained in greater detail below, to a conveyor arrangement 6, for example a bucket elevator or the like, which conveys it to a classification zone with two air separators, namely a first air separator 7 and a second air separator 8, in which the comminution product from the mill 4 is classified into fines (arrow F1 or arrow F2) and oversize material (according to arrows G1 and G2). These two air separators 7, 8 of the classification zone are connected in series. A conveyor connection 9, such as a conveyor line, is provided between the oversize material outlet 7b of the first air separator 7 and the material inlet a of the second air separator, and has oversize material divider 10 with two oversize material branches 10a and 10b. The first oversize material branch 10a of this oversize material divider 10 is connected by a return conveyor line 11 to the material inlet shaft 3 of the mill 4, whilst the second oversize material branch 10b is connected to the material inlet 8a of the second air separator 8. Thus a selectable proportion of the oversize material G1 from the first air separator 7 can be fed to the second air separator 8 which is connected after it in series for further classification, whilst the remaining proportion of the oversize material from the first air separator 7 can be returned to the mill 4 via the return conveyor line 11 for further comminution. The oversize material (G2) coming out of the second air separator 8 through the oversize material outlet 8b can also be returned all together to the mill 4 or to the inlet shaft 3 thereof—also preferably via the return conveyor line 11. The fines outlets 7c and 8c of both air separators 7, 8 are brought together for combined removal of the part-streams of fines (F1 and F2), so that all of the fines occurring in both air separators 7, 8 can be drawn off as finished material or finished product (FP).

Depending upon the requirement, the part-streams of fines from the two air separators 7, 8 can be brought together directly from the fines outlets 7c and 8c or they can each be previously passed through an associated cyclone separator 7d or 8d respectively which are connected to a dust collector 12, for example in the form of a suitable filter, to which the two air separators 7, 8 can also be connected (as shown in each case by broken lines). In the dust collector 12 precipitated fines can also—as indicated by the arrow F3—be delivered to the finished product FP.

As has already been explained above in the method of operation, it is preferred that the first air separator 7 is constructed in the form of a fine separator in order to achieve a particularly fine quantity of finished product and the subsequent second air separator 8 is constructed in the form of a coarse separator in which the proportion of fines (arrow F2) can be kept relatively coarse by comparison with the first air separator 7 in order thereby to be able to set the particle size distribution in the finished product FP within the sufficiently wide range required in each case.

It is also preferred if at least the first air separator 7 is constructed in the form of a high-capacity separator which is known per se in the manner of a rotor, in which the rotor speed and also the separating air supply and possibly the separating air distribution can be adjusted. In the example according to FIG. 1 it may be assumed that both air separators 7, 8 connected one behind the other in series are constructed in the form of such high-capacity separators. By means of such high-capacity separators which can be regulated within wide limits it is possible for both the particle size distribution of the fines (F1 and F2) of each air separator 7 and 8 by itself and also the particle size distribution of the total finished product FP from both air separators 7, 8 to be set in the desired manner in each case.

Moreover, however, the possibility also exists for the second air separator 8, which is constructed as a coarse separator, to be constructed in another way, for example and preferably as a fluidised bed separator with at least one upper discharge cone which is adjustable in height. Such a construction of a fluidised bed separator is explained again below in connection with the example of apparatus according to FIG. 2.

In general any suitable mill could be used as the mill 4 for comminution of the delivered grinding material components. However, in the combination of apparatus parts previously described it is particularly preferred to use for the comminution of the material for grinding a high-pressure grinding roll mill 4 which is known per se in which the material for grinding is comminuted in a particularly energy-saving manner in the grinding gap S between two rolls 4a which revolve in opposite directions and are pressed against one another at high pressure. If during this comminution an agglomerated comminution product, particularly in the form of so-called scabs, occurs in the high-pressure grinding roll mill 4—depending upon the feed material—then it will be advantageous for these scabs to be broken up in the disagglomerator 5 arranged after the mill 4 for the purpose of improved separation possibilities. However, if the comminution product coming from the mill 4 contains hardly any agglomerates or no agglomerates at all, then the disagglomerator 5 can also be omitted or—as indicated by broken lines—can be bypassed.

For many comminution methods it has proved advantageous if before the disagglomerator 5 an adjustable proportion of the comminution product coming from the mill 4 is branched off and returned directly to the mill 4, whilst only the remaining proportion of the comminution product is passed to the disagglomerator 5 so that the scabs can be broken up there (as is known per se). Accordingly it is advantageous to arrange before the disagglomerator 5 or the inlet thereof a product divider 13 which is connected by a first branch line 13a to the disagglomerator 5 and by a second branch line 13b —as indicated by dash-dot lines—to the material inlet shaft 3 of the mill 4 so that an adjustable proportion of the comminution product coming from the mill 4 is broken up on the disagglomerator 5 and is then delivered via the conveyor arrangement 6 to the classification zone or to the material inlet 7a of the first air separator 7, whilst the proportion of comminution product branched off before the disagglomerator 5 is returned to the mill 4 for further comminution.

Figure 2:
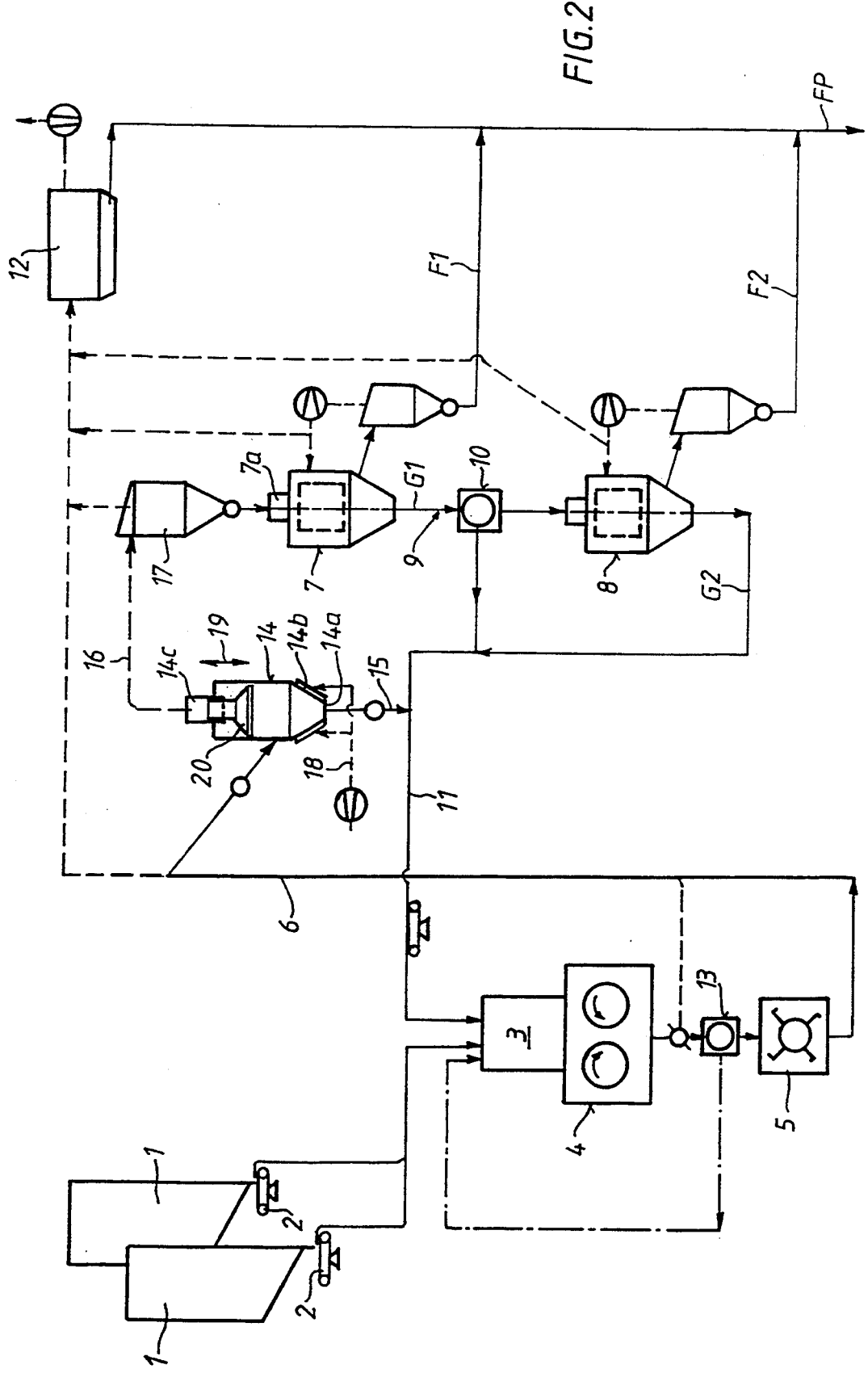

In the second embodiment of the comminution apparatus illustrated in FIG. 2 the actual comminution and the classification in the classification zone can be carried out in principle in the same way and with the same apparatus parts as has previously been described with the aid of the first embodiment illustrated in FIG. 1, so that the same parts are identified by the same reference numerals and do not have to be explained in detail again. Accordingly this embodiment also basically contains the following apparatus parts:

feed bin 1,
belt scales 2,
a material inlet shaft 3,
a mill, preferably a high-pressure grinding roll mill 4,
possibly a disagglomerator 5,
a conveyor arrangement 6,
a first air separator 7,
a second air separator 8,
a conveyor connection 9,
an oversize material divider 10,
a return conveyor line 11,
a dust collector 12,
optionally a product divider 13.

The special feature of this second embodiment (FIG. 2) lies in the fact that a coarse preliminary separator 14 is arranged before the first air separator 7 of the classification zone and is connected by an oversize material return line 15—via the return conveyor line 11—to the mill inlet formed by the material inlet shaft 3 and is connected by its fines line 16 to the material inlet 7a of the first air separator. A fines separator 17 is advantageously also provided in this fines line 16 if—as in the present case—the fines are conveyed out of the preliminary separator 14 as a mixture of fines and air. The air to be drawn out of the fines separator 17 is also introduced into the dust collector 12.

Although in general any suitable preliminary separator can be used as the coarse preliminary separator 14, it is preferred—as indicated schematically in FIG. 2—for the preliminary separator 14 to be constructed in the form of a fluidised bed separator. Accordingly the preliminary separator 14 has in its lower region a funnel-shaped oversize material outlet 14a and an inlet base 14b connected to a separating air supply 18, whilst in its upper region an outlet 14c for an air/fines mixture and at least one outlet cone 20 which is adjustable in height—according to the double arrow 19—are provided. By means of the construction and arrangement of this—at least one—adjustable outlet cone 20 the separation limit of the material to be separated (comminution product) can be set in the desired manner. Moreover, this provision of at least one outlet cone 20 facilitates a relatively high specific material bed loading of the separating air leaving the preliminary separator 14 at the outlet 14c, so that particularly high throughputs can be ensured in the conveying path from the mill 4 to the classification zone with the two air separators 7 and 8. Moreover, such a fluidised bed separator is exposed to relatively little wear, even with relatively abrasive material, and it can be operated in a particularly energy-saving manner.

The arrangement of such a coarse preliminary separator 14 has the advantage that the air separators 7, 8 of the classification zone can be kept free of excessively coarse material for separating (comminution product), so that on the one hand they can be operated more selectively and on the other hand they can be of relatively small construction. Above all when at least the first air separator 7 or the classification zone is constructed—as described above—as a high-capacity separator in the manner of a rotor, then the arrangement of the preliminary separator 14 thereby also offers the further advantage that particles of oversize material which cause particularly intensive wear can already be precipitated out of the comminution product before the first air separator 7 and returned to the mill 4, so that this first air separator 7 can be protected from excessive wear by particularly large particles of oversize material.

In connection with the construction of this preliminary separator 14 as a fluidised bed separator reference is again made to the embodiment according to FIG. 1, in which—as indicated above—the second separator 8, which acts as a coarse separator, of the classification zone can also be constructed in the form of a fluidised bed separator if required, and can in principle be constructed in the same way as the preliminary separator 14, but particularly adapted for the classification work in the classification zone. Naturally, the same also applies to the second air separator 8 in the embodiment according to FIG. 2.

We claim

1. A method of comminuting brittle material comprising:
   comminuting brittle material in a mill to produce a comminuted product having different particle sizes;
   separating the comminuted product in a first stage into a first fine fraction and an oversized fraction;
   separating the first fine fraction from the oversized fraction;
   dividing the oversized fraction into two streams;
   returning one of the two streams to the mill for further comminution;
   separating the other of said streams in a second stage downstream of the first separating stage into an additional fraction of fine material and a remaining fraction of relatively coarse material;
   combining the additional fine fraction with the first fraction; and
   returning the remaining fraction of relatively coarse fraction of material to the mill for further comminution.

2. The method of claim 1 wherein the separations in said first stage produces a fine fraction that is relatively finer than the fraction of fine material produced in the second stage.

3. The method of claim 1 including subjecting the comminuted product to a course preliminary separation treatment upstream of the first stage to separate relatively oversized material from relatively finer material, returning the oversized material to the mill for further comminution, and passing the remainder of the relatively finer material to the first stage.

4. The method of claim 3 wherein the preliminary separation treatment is accomplished by passing the comminuted product through a fluidized bed separator.

5. The method of claim 1 wherein the brittle material is comminuted in a high-pressure grinding roll mill between contrarotating rolls forced against one another at high pressure.

6. The method of claim 5 including passing the comminuted product through a disagglomeration stage upstream of the first stage.

7. The method of claim 1 including adjusting the separator of the first stage to adjust the particle size distribution of the fine fraction.

8. Apparatus for the comminution of brittle material comprising:
   a mill having a comminution zone for comminuting brittle material delivered thereto; and
   means forming a classification zone downstream of said mill including:
   a) a first stage separator for receiving and separating the comminuted material into first relatively fine and coarse fractions, said first stage separator having an outlet for each of the coarse and fine fractions;
   b) a material divider communicating with said coarse fraction outlet of said first stage separator for selectively dividing said first coarse fraction of material into two streams;
   c) means communicating with one of said streams for returning the material of said one of said streams to said mill and delivering the other of said streams to a second separator for further separation of an additional second fraction of fine material from the remaining relatively coarser, oversized material, said second separator having an outlet for each of the second coarse and fine fractions;
   e) means communicating with said coarse material outlet of said second separator for returning said second coarse fraction to said mill; and
   f) means communicating with the fine fraction outlets of each of said first and second separators for combining the first and second fine fractions with one another.

9. The apparatus of claim 8 wherein said first and second stage separators are constructed as fine and coarse separators, respectively, to separate relatively finer and coarser material, respectively, as said first and said second fine fractions.

10. The apparatus of claim 9 wherein at least said first stage separator comprises a high-capacity separator having an adjustable-speed rotor and an adjustable air supply.

11. The apparatus of claim 10 wherein each of said first and second separators is constructed as a high-capacity separator.

12. The apparatus of claim 11 wherein said second stage separator comprises a fluidized bed separator having at least one adjustable-height upper discharge cone.

13. The apparatus of claim 8 including coarse preliminary separator means upstream of said first stage separator for separating a preliminary coarse fraction of material from the remaining relatively finer preliminary fraction of material, and means communicating with said preliminary separator means for returning said preliminary coarse fraction to said mill and for passing said finer preliminary fraction to said first stage separator.

14. The apparatus of claim 13 wherein said coarse preliminary separator means comprises a fluidized bed separator having a lower region provided with an inlet for receiving the comminuted material, said inlet communicating with a separating air supply to separate said preliminary finer fraction of said material from said preliminary coarse fraction, said lower region further having an outlet for the discharge of said preliminary coarse fraction of material, and an upper region provided with an outlet having an adjustable-height outlet cone associated therewith for the discharge of said finer fraction of material.

15. The apparatus of claim 8 wherein said mill comprises a high-pressure grinding mill having a pair of contrarotating rolls urged toward one another at high pressure.

16. The apparatus of claim 15 including disagglomerator means between said grinding mill and said first stage for breaking up agglomerated comminuted product produced by said grinding mill.

17. The apparatus of claim 16 including material divider means between said mill and said disagglomerator means having a first branch line connected to said disagglomerator means and a second branch line connected to an inlet of said mill.

* * * * *